(12) United States Patent
Ding et al.

(10) Patent No.: US 10,839,422 B2
(45) Date of Patent: Nov. 17, 2020

(54) METHOD AND APPARATUS FOR GUIDING SERVICE FLOW

(71) Applicant: Alibaba Group Holding Limited, Grand Cayman (KY)

(72) Inventors: Weiwei Ding, Hangzhou (CN); Chen Tao, Hangzhou (CN); Feng Jin, Hangzhou (CN); Zhenyu Lu, Hangzhou (CN); Jiajun Wen, Hangzhou (CN); Yonggang Du, Hangzhou (CN); Wenming He, Hangzhou (CN); Zhaolin Feng, Hangzhou (CN); Zhirong Yang, Hangzhou (CN); Kai Yang, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 16/562,911

(22) Filed: Sep. 6, 2019

(65) Prior Publication Data

US 2019/0392480 A1  Dec. 26, 2019

Related U.S. Application Data

(63) Continuation of application No. PCT/CN2018/078159, filed on Mar. 6, 2018.

(30) Foreign Application Priority Data

Mar. 9, 2017 (CN) .......................... 201710139131

(51) Int. Cl.
  *G06Q 30/02* (2012.01)
  *H04L 29/08* (2006.01)
(52) U.S. Cl.
  CPC ..... *G06Q 30/0255* (2013.01); *G06Q 30/0277* (2013.01); *H04L 67/22* (2013.01)

(58) Field of Classification Search
  CPC .................................................. G06Q 30/0255
  (Continued)

(56) References Cited

U.S. PATENT DOCUMENTS 8,665,743 B2 * 3/2014 Zhu ..................... H04W 64/006
                                                    370/252
2008/0235080 A1   9/2008 Chess et al.
(Continued)

FOREIGN PATENT DOCUMENTS

CN    102026151    4/2011
CN    102163205    8/2011
(Continued)

OTHER PUBLICATIONS

Aghasaryan et al., "A profiling engine for converged service delivery platforms," Bell Labs Technical Journal, Jul. 2008, 13(2):93-103.

(Continued)

*Primary Examiner* — Azam A Ansari
(74) *Attorney, Agent, or Firm* — Fish & Richardson P.C.

(57) ABSTRACT

In an implementation, guiding a service flow is described. Historical behavior data of one or more users who use a target service is obtained for the target service. The historical behavior data is analyzed to obtain one or more user features. One or more target users are selected from one or more users who do not use the target service based on the one or more user features. Each target user has at least one of the one or more user features. Service flow guiding information is sent to each target user. The service flow guiding information guides each target user to use the target service.

20 Claims, 10 Drawing Sheets

(58) Field of Classification Search
USPC .................................................. 705/14.53
See application file for complete search history.

(56) References Cited

U.S. PATENT DOCUMENTS

| | | | | |
|---|---|---|---|---|
| 2011/0112981 | A1* | 5/2011 | Park | G06Q 30/02 |
| | | | | 705/347 |
| 2013/0080362 | A1* | 3/2013 | Chang | G06Q 30/0255 |
| | | | | 706/21 |
| 2014/0172573 | A1 | 6/2014 | Saurabh | |
| 2016/0253710 | A1* | 9/2016 | Publicover | H04W 4/21 |
| | | | | 705/14.66 |

FOREIGN PATENT DOCUMENTS

| | | |
|---|---|---|
| CN | 102881239 | 1/2013 |
| CN | 103150696 | 6/2013 |
| CN | 104239571 | 12/2014 |
| CN | 104636164 | 5/2015 |
| CN | 105227445 | 1/2016 |
| CN | 105246101 | 1/2016 |
| CN | 105323322 | 2/2016 |
| CN | 105989004 | 10/2016 |
| CN | 106126537 | 11/2016 |
| CN | 107087017 | 8/2017 |
| JP | 2002334201 | 11/2002 |
| JP | 2005157690 | 6/2005 |
| JP | 2005208943 | 8/2005 |
| JP | 2010237305 | 10/2010 |
| JP | 2012008873 | 1/2012 |
| JP | 2012075143 | 4/2012 |
| TW | 571209 | 1/2004 |
| TW | I526963 | 3/2016 |
| WO | WO 2015200452 | 12/2015 |

OTHER PUBLICATIONS

Extended European Search Report in European Application No. 18764096.6, dated Oct. 4, 2019, 7 pages.

Crosby et al., "BlockChain Technology: Beyond Bitcoin," Sutardja Center for Entrepreneurship & Technology Technical Report, Oct. 16, 2015, 35 pages.

Nakamoto, "Bitcoin: A Peer-to-Peer Electronic Cash System," www.bitcoin.org, 2005, 9 pages.

PCT International Preliminary Report on Patentability in International Application No. PCT/CN2018/078159, dated Sep. 10, 2019, 10 pages (with English translation).

PCT International Search Report and Written Opinion in International Application No. PCT/CN2018/078159, dated Apr. 27, 2018, 14 pages (with English translation).

* cited by examiner

METHOD AND APPARATUS FOR GUIDING SERVICE FLOW

CROSS-REFERENCE TO RELATED APPLICATIONS

This application is a continuation of PCT Application No. PCT/CN2018/078159, filed on Mar. 6, 2018, which claims priority to Chinese Patent Application No. 201710139131.1, filed on Mar. 9, 2017, and each application is hereby incorporated by reference in its entirety.

TECHNICAL FIELD

The present disclosure relates to the field of Internet application technologies, and in particular, to a method and an apparatus for guiding a service flow.

BACKGROUND

Different services have different users. Some services may have more users, and some services may have fewer users. To increase a traffic volume of a certain service, "inter-service cross-guiding" is a method. For example, a user of another service may be led to use a service expected to increase. An online payment service is used as an example. A user can pay a water bill, an electricity bill, a gas bill, a cable television bill, etc. by using an application installed on a mobile device. However, a user does not necessarily use all types of services, and a user who enables an electricity bill payment service may not enable a water bill payment service.

SUMMARY

In view of this, the present disclosure provides a method and an apparatus for guiding a service flow, to improve guiding accuracy.

The present disclosure is implemented by using the following technical solutions:

According to a first aspect, a method for guiding a service flow is provided, and the method includes: obtaining, for a target service, historical behavior data of a user who uses the target service; analyzing the historical behavior data to obtain a user feature used to determine a target user for service flow guiding; selecting, from users who do not use the target service, a user who satisfies the user feature as the target user; and sending service flow guiding information to the target user, to lead the target user to use the target service.

According to a second aspect, a method for guiding a service flow is provided, and the method includes: determining, for any target service in an associated service group, a user who uses the target service; obtaining service usage information of the user for the associated service group based on historical behavior data of the user; and if it is determined, based on the service usage information, that the user does not use an associated service, sending service flow guiding information to the user, to lead the user to use the associated service, where the associated service is a service other than the target service in the associated service group.

According to a third aspect, an apparatus for guiding a service flow is provided, and the apparatus includes: a data acquisition module, configured to obtain, for a target service, historical behavior data of a user who uses the target service; a data analysis module, configured to analyze the historical behavior data to obtain a user feature used to determine a target user for service flow guiding; a user selection module, configured to select, from users who do not use the target service, a user who satisfies the user feature as the target user; and an information sending module, configured to send service flow guiding information to the target user, to lead the target user to use the target service.

According to a fourth aspect, an apparatus for guiding a service flow is provided, and the apparatus includes: a user determining module, configured to determine, for any target service in an associated service group, a user who uses the target service; an information acquisition module, configured to obtain service usage information of the user for the associated service group based on historical behavior data of the user; and a guiding processing module, configured to: if it is determined, based on the service usage information, that the user does not use an associated service, send service flow guiding information to the user, to lead the user to use the associated service, where the associated service is a service other than the target service in the associated service group.

According to the method and apparatus for guiding a service flow in the present disclosure, when a target user for guiding is selected, a user who can use a target service is predicted through data analysis, and the user is used as the target user. In comparison with a method in the existing technology that a user is not distinguished, guiding is more specific, so that a guiding effect can be improved.

DESCRIPTION OF IMPLEMENTATIONS

Figure 1:
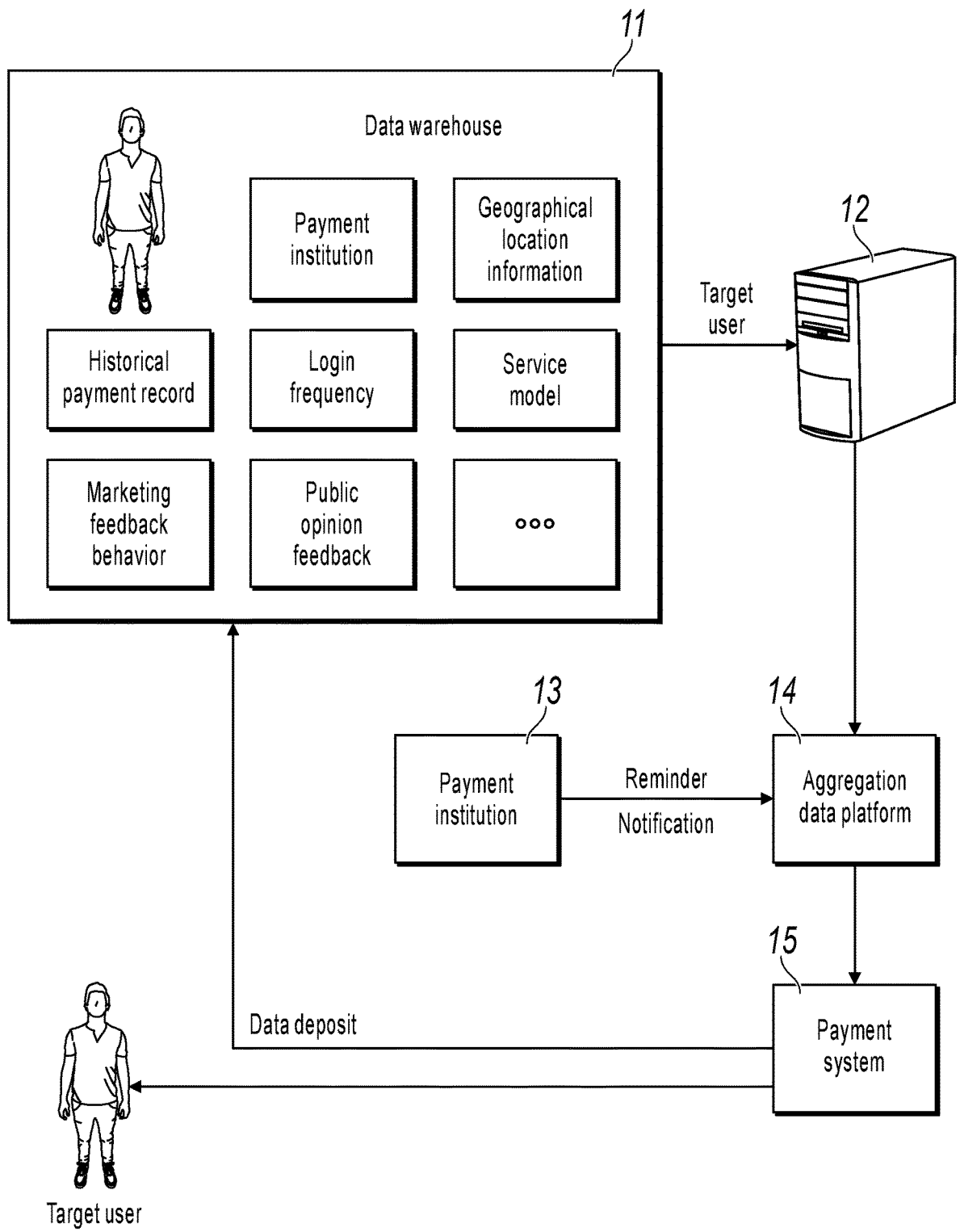
FIG. 1 illustrates an application system of a method for guiding a service flow, according to an implementation of the present disclosure.

"Inter-service cross-guiding" is a method for leading new users to different services, to achieve service growth. For example, in a conventional inter-service cross-guiding method, an access portal for paying a water bill is provided when an electricity bill is being paid, and a user may use a water bill payment service when seeing the access portal, so that traffic of the water bill payment service increases. However, this guiding method of providing access portals of different services to each other is passive guiding. For a user seeing a service access portal, it is unknown whether the user uses the recommended service through the portal. Some users may have no interest in the service provided by using the portal, or it is possible that the user is already using the service. As such, the static guiding method of providing an access portal cannot achieve a good guiding effect and can cause non-specific and ineffective recommendation, and therefore resource waste is caused. In addition, the static guiding method imposes a high trigger requirement, and can be triggered only when a user uses a service.

Based on this, an implementation of the present application provides an inter-service cross-guiding method. In the method, guiding is implemented by analyzing historical data to obtain a potential user who is more inclined to use a certain service and sending a guiding notification only to the user during guiding instead of statically providing a service access portal. In the method, user selection is more specific, so that a guiding effect can be improved.

The method in the present application is described below by using inter-service cross-guiding of an online payment service as an example. However, the method may also be applied to another similar application scenario, and is not limited to the online payment service. In the online payment service, there are tens of millions of payment users. Online payment services can include a plurality of types of payment services such as an electricity bill payment service, a water bill payment service, a gas bill payment service, and a cable television bill payment service. Many users may enable only one or two services, and do not use all the services. For example, some users enable the gas bill service, but do not enable the water bill service. Some users enable the electricity bill service, but do not enable the water bill service. According to the guiding method in the present application, a user who uses a type of service can be led to another service, to increase a traffic volume of the another service. For example, a user who uses an electricity bill service can be led to a water bill service. Certainly, a user who enables no service can be led to a certain service provided that the user uses an application that includes the online payment service. For example, a user installs and uses an application on an intelligent device of the user, and there is a service portal of the online payment service on the application, but the user never uses the online payment service. In this case, such a user can also be led by using the method in this example.

Figure 2:
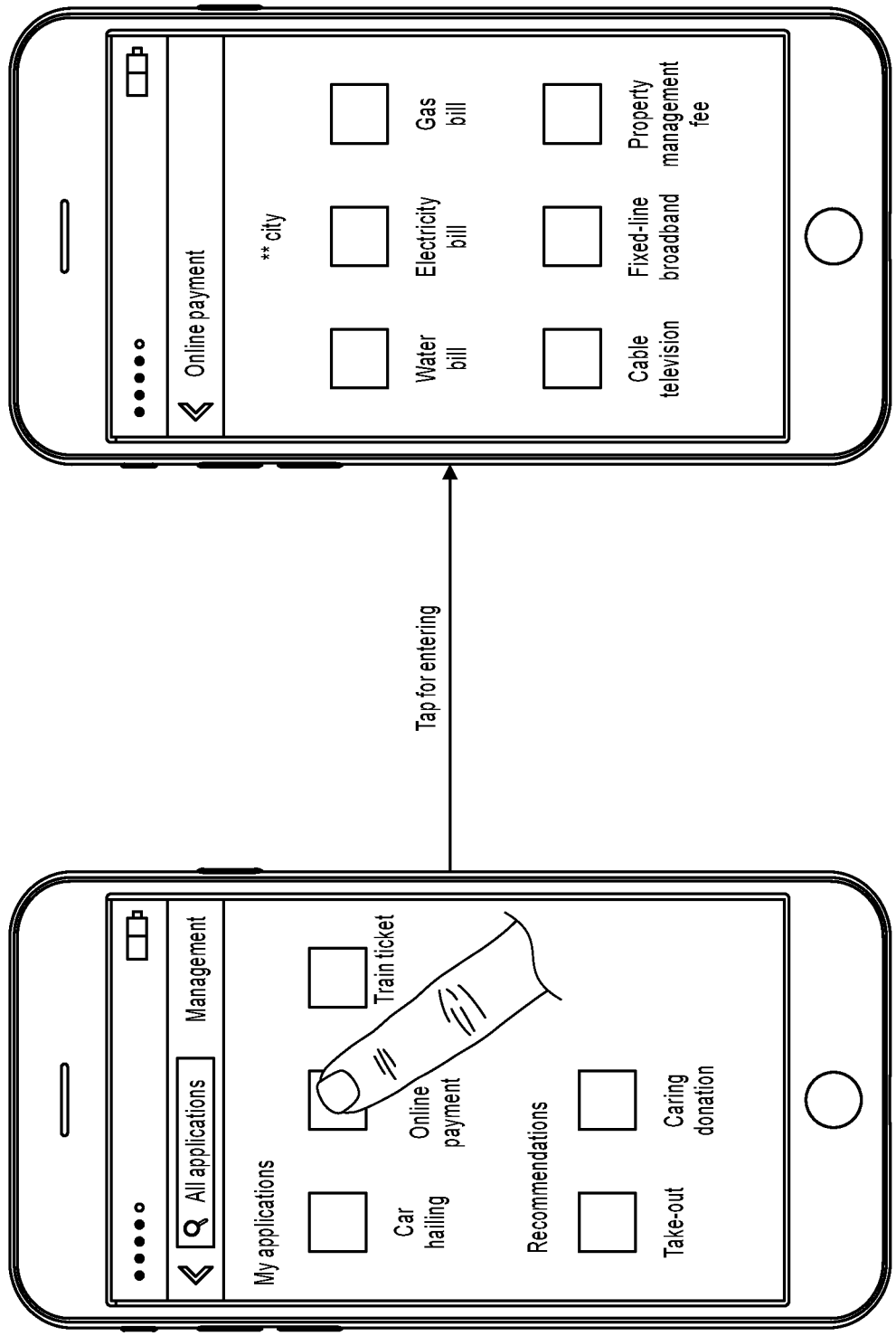
FIG. 2 is a schematic application diagram illustrating an online payment service module, according to an implementation of the present disclosure.

FIG. 1 shows an example of an application system of a method for guiding a service flow. The application system can be used to describe inter-service cross-guiding in an online payment service scenario. For example, an online payment service can be an application module installed in a certain APP of a user. As shown in an example in FIG. 2, the user can tap an "online payment" module in the APP. After entering the online payment module, it can be seen that the online payment service module can include a plurality of types of payment services such as a water bill payment service and an electricity bill payment service.

When a user registers an APP, information involved when the user implements various services by using the APP can be obtained and stored in a data warehouse 11 in FIG. 1. Even if the user does not use the online payment service, other services such as online shopping and train ticket purchase on the APP may be used, and information involved in service use can be stored in the data warehouse 11. In an example, the data warehouse 11 can store historical behavior data of a user who uses an electricity bill payment service. For example, the historical behavior data can include a geographical location range (for example, a neighborhood in a city of a province) that the user is located in, a historical payment record (for example, a date of a historical payment), a payment institution (for example, an electricity company that a payment is made to), etc.

Figure 3:
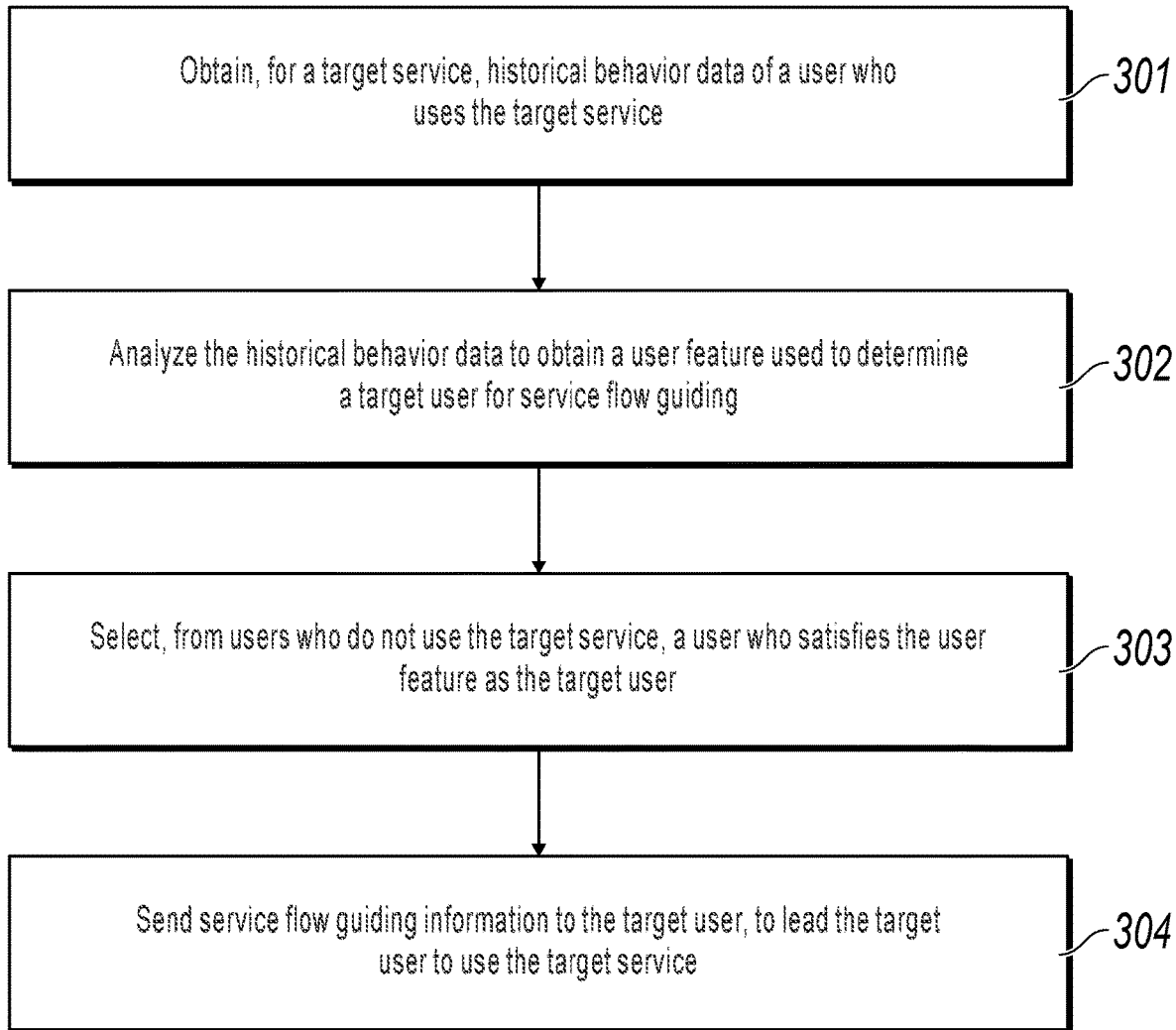
FIG. 3 is a schematic flowchart illustrating a method for guiding a service flow, according to an implementation of the present disclosure.

The data warehouse 11 can further include a large amount of other user information. In the method in this example of the present application, data in the data warehouse is used to perform data analysis, and a result of the data analysis is applied to inter-service cross-guiding in the present application, to achieve a better guiding effect. With reference to FIG. 3 and FIG. 1, the following describes how data analysis provides assistance for inter-service cross-guiding. As shown in FIG. 3, the method can include the following steps.

Step 301: Obtain, for a target service, historical behavior data of a user who uses the target service.

For example, if data of an electricity bill payment user is analyzed to lead another user who has not used an electricity bill service to use the electricity bill service, the analyzed electricity bill payment user can be referred to as a "seed user", and the electricity bill service can be referred to as a target service in this example.

An application (APP) can obtain data of a user who uses the electricity bill service on the application. For example, the historical behavior data can include data such as geographical location information of the user, a historical payment record, and an electricity company that a payment is made to. The data can be stored in the data warehouse 11 in FIG. 1. In addition, the target service can have one or more seed users in the present step.

Step 302: Analyze the historical behavior data to obtain a user feature used to determine a target user for service flow guiding. In this example, data analysis can be performed based on the data of the electricity bill user in step 301 to predict a user (namely, a user who has not used the electricity bill service) who can use the electricity bill service. The predicted user can be referred to as a target user, and the target user is led to the electricity bill service.

In a process of determining the target user, a user needs to be selected as the target user, and therefore a basis for user selection is needed. In the present step, the historical behavior data of the seed user in step 301 can be analyzed to obtain a user feature used to match the target user in subsequent steps.

For example, the user feature can be a geographical location range that a user is located in, and the geographical location range can be, for example, information about a neighborhood that the user is located in. For example, there may be a prominent regional feature for an online payment service. A user in neighborhood A and a user in neighborhood B may pay to different electric power companies. When guiding information is sent, for example, when a bill reminder is sent, it is unsuitable to send a bill reminder of neighborhood A to a user in neighborhood B because a bill of neighborhood A comes from company a, and neighborhood B is not a service coverage area of company a. During the data analysis and prediction in the present step, a user who can use the target service can be selected as the target user based on the regional feature. For example, another user who has not used the electricity bill service in neighborhood A can be selected as the target user based on an analysis result of data of an electricity bill user in neighborhood A. Detailed description is provided below by using an example.

Step 303: Select, from users who do not use the target service, a user who satisfies the user feature as the target user. For example, a user who is located in the same neighborhood as the seed user can be selected as the target user. Information about the target user that is obtained through analysis in the present step can be stored in a server 12 in FIG. 1.

Step 304: Send service flow guiding information to the target user, to lead the target user to use the target service. The service flow guiding information in the present step can be information used to lead the target user to use the target service. An online payment service is used as an example. For example, the guiding information in the present step can be a bill reminder of an electricity bill. In an example, a bill reminder of a certain electricity bill service can be sent not only to an electricity bill user in neighborhood A, but also to a user who has not used the electricity bill service in neighborhood A, to lead the user who has not used the electricity bill service to use the electricity bill service, to increase electricity bill service traffic.

With reference to FIG. 1, some reminders or notification messages sent by a payment institution 13 can be sent to an aggregation data platform 14. The aggregation data platform 14 can further determine, based on data of the target user on the server 12, a message to be sent by the payment institution 13 as the guiding information, and send the guiding information to the target user by using the payment system 15. If guiding succeeds, for example, the target user who has not used the electricity bill service uses, based on the guiding, the electricity bill service to pay an electricity bill, a payment system 15 can deposit latest data in the data warehouse 11. In this case, the original target user becomes an electricity bill user, and participates in next data analysis and target user selection.

According to the method for guiding a service flow in this example, when a target user for guiding is selected, a user who can use a target service is predicted through data analysis, and the user is used as the target user. In comparison with a method in the existing technology that a user is not distinguished, guiding is more specific, so that a guiding effect can be improved. In addition, in the method, even if the user does not use the service, service flow guiding information can be received, and it is likely to draw user attention.

The method for guiding a service flow in the present application is described below by using two examples, but is not limited to these ways in actual implementation.

Figure 4:
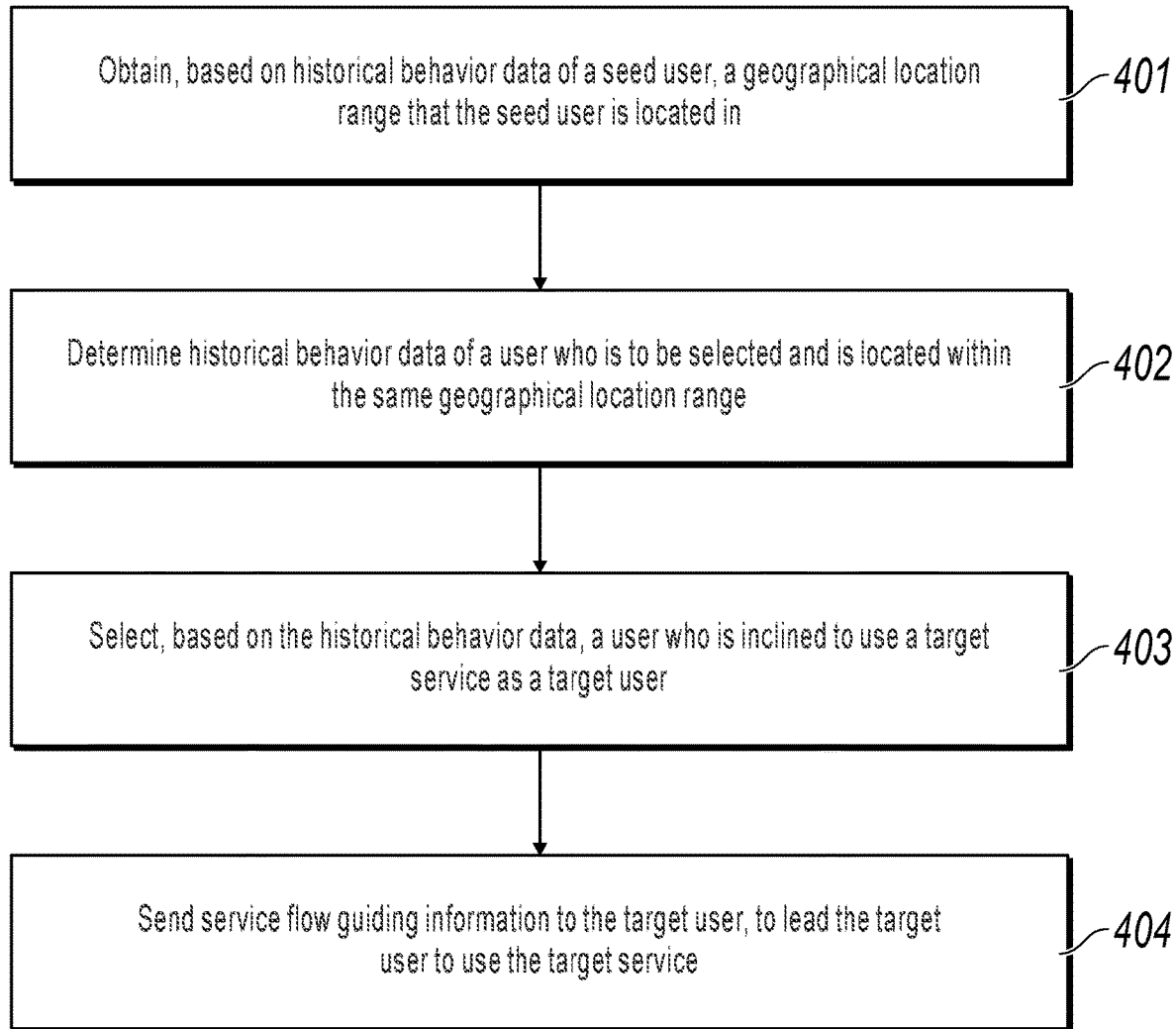
FIG. 4 is a schematic flowchart illustrating another method for guiding a service flow, according to an implementation of the present disclosure.

FIG. 4 shows an example of a method procedure for guiding a service flow. In this example, a geographical location range that a seed user is located in can be used, and inter-service guiding is performed on another potential user who is located within the same geographical location range. In this example, a user feature used to match a target user can be geographical location range information.

Step 401: Obtain, based on historical behavior data of a seed user, a geographical location range that the seed user is located in.

An electricity bill service in online payment services is used as an example. A user who uses an electricity bill payment service on an APP can further use the APP for online shopping, etc., and therefore address information of the user can be obtained. Alternatively, a geographical location of the user can be obtained in a way such as location-based service (LBS) positioning, to obtain a geographical location range of the user. The geographical location range in this example is described by using a neighborhood that the user is located in as an example. The neighborhood that the user is located in can be referred to as a target neighborhood.

Step 402: Determine historical behavior data of a user to be selected and is located within the same geographical location range.

For example, an APP user who is located in the same neighborhood as the user in step 401 can be used as the user to be selected. The user to be selected can be a user who uses an application (APP) but does not use any type of online payment service on the application. Alternatively, the user to be selected can be a user who uses at least one type of online payment service, but the used payment service is not the electricity bill service. For example, the user uses a water bill service or a gas bill service.

The historical behavior data of the user to be selected in the present step can also include a plurality of types of data that are related to the user and that can be obtained from historical behavior of using the APP by the user, for example, address information, a login frequency, and public opinion feedback of the user. The historical behavior data of the user to be selected is applied to the next step.

Step 403: Select, based on the historical behavior data, a user who is inclined to use a target service as a target user.

In the present step, data analysis can be performed based on the historical behavior data of the user to be selected that is obtained in step 402, to select the target user. For example, there can be many users who are to be selected and are located in the same neighborhood as the seed user in step 401. If a guiding reminder is sent to all the users who are to be selected, guiding is not precise. In the present step, screening can be further performed on these users who are to be selected, and a user who is inclined to use the target service is selected from the users who are to be selected as the target user. Here, the inclination to use the target service means that there is a high probability that the user uses the electricity bill service in the guiding reminder. A user with the inclination can be obtained based on the data analysis in step 402.

For example, assume that the historical behavior data of the user to be selected that is obtained in step 402 can include historical publishing information of the user to be selected. The publishing information can be public opinion information. For example, the historical public opinion information can be some public opinions published by the user, for example, "hope the electricity bill payment service in the neighborhood can be enabled as soon as possible" and "expect to know how to use the electricity bill service". The public opinion information indicates that the user to be selected expects to use the target service, namely, the electricity bill service in this example, and therefore such a user is used as the target user for guiding. As such, accuracy is higher, and guiding is more likely to succeed. Therefore, the user who is reflected by the historical public opinion information and is inclined to use the target service can be used as the target user.

Certainly, there can be many methods for selecting the target user from the users to be selected, and an implementation is not limited to the previous example of selecting the target user based on the public opinion information. For example, in a subsequent example shown in FIG. 5, a method for selecting the target user is further described, and this method can also be applied to this example. In addition, the procedure in this example is an example that the user who is inclined to use the target service can be selected. In actual implementation, even if it cannot be determined whether a user has the inclination, the user can be used as the target user provided that the user satisfies the user matching feature. For example, a user can be selected as the target user provided that the user is located in the same neighborhood as the seed user.

Step 404: Send service flow guiding information to the target user, to lead the target user to use the target service.

For example, in this example, a service message of an institution not only reaches an electricity bill user, but also reaches more users in the same neighborhood. For example, a bill reminder of the institution is not only received by the electricity bill user, but also can be received by a potential non-payment user (for example, a user who uses a service such as a water bill service, a gas bill service, or a cable television bill service or a user who does not use any type of payment service in the same neighborhood) in the neighborhood that the electricity bill user is located in, so that the target non-payment user becomes a payment user. The bill reminder can be sent to a target user group with reference to a service model feature of the institution such as a bill period or a bill record of an electricity bill user.

Figure 5:
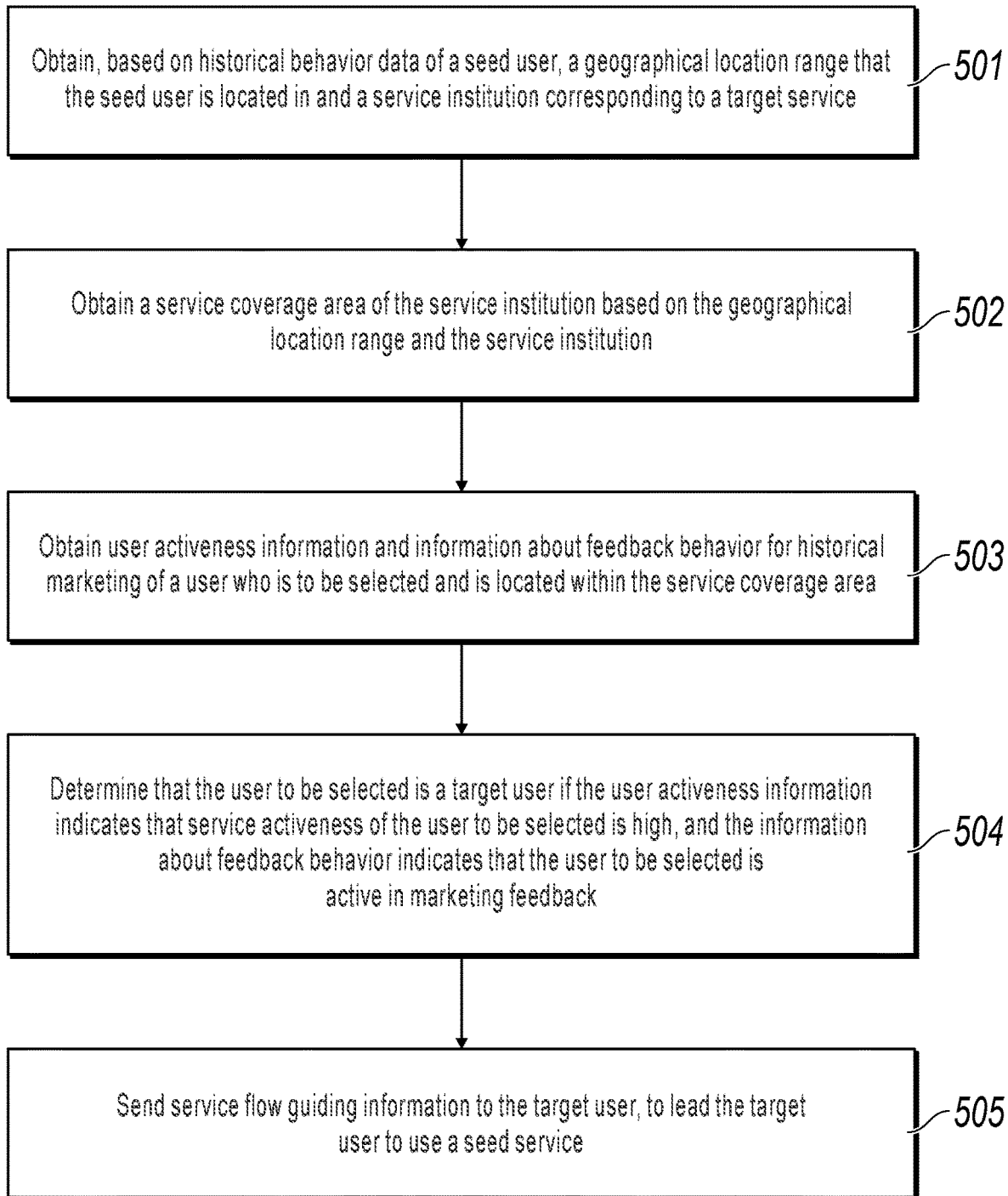
FIG. 5 is a schematic flowchart illustrating still another method for guiding a service flow, according to an implementation of the present disclosure.

FIG. 5 shows an example of another method procedure for guiding a service flow.

In this example, a new user in a geographical location range within a service coverage area of a payment institution corresponding to a seed user can be obtained, and the new user is used as a target user, to perform inter-service guiding.

Step 501: Obtain, based on historical behavior data of a seed user, a geographical location range that the seed user is located in and a service institution corresponding to a target service.

For example, the geographical location range is a neighborhood. For a way of determining a target neighborhood, reference can be made to the example in FIG. 4. A service institution can be comprehensively determined based on data of a plurality of seed users. For example, data in a data warehouse includes a neighborhood that many users are located in and a service institution that the users pay electricity bills to, namely, "user is located in neighborhood A and pays the electricity bill to electricity company D1" and "user is located in neighborhood B and also pays the electricity bill to electricity company D1". A payment institution can be obtained from information of using an electricity bill payment service by the users.

Step 502: Obtain a service coverage area of the service institution based on the geographical location range and the service institution.

For example, it can be learned by combining the two examples in step 501 that "service coverage areas of the two companies include neighborhood A and neighborhood B". In addition, during data analysis in step 501, some data may be incorrect. For example, a user is incorrectly positioned, and should be located at neighborhood A, but is incorrectly positioned to be located at neighborhood C, and data is "user is located in neighborhood C and also pays the electricity bill to electricity company D1". In this case, because a service institution can be comprehensively determined based on data of a plurality of seed users, if most of users in neighborhood C correspond to electricity company D2, it can be determined that the data is incorrect, and is not used. In other words, a certain quantity of samples can be comprehensively analyzed to accurately determine a service institution.

Step 503: Obtain user activeness information and information about feedback behavior for historical marketing of a user who is to be selected and is located within the service coverage area.

For example, in the present step, historical behavior data of the user to be selected can be obtained. For example, the historical behavior data includes the user activeness information, and a login frequency of the user. If the login frequency is high, it indicates that the user is active. The information about feedback behavior of the user for the historical marketing can be further obtained, to reflect whether the user is interested in a notification or reminder.

In the present step, the user to be selected can be selected from the service coverage area determined in step 502. For example, in the previous example, a user who uses an application APP but does not use any type of online payment service can be selected from the service coverage area "neighborhood A and neighborhood B" of company D1. Alternatively, the user to be selected can be a user who uses at least one type of online payment service, but the used payment service is not an electricity bill service. For example, the user uses a water bill service or a gas bill service.

Step 504: Determine that the user to be selected is a target user if the user activeness information indicates that service activeness of the user to be selected is high, and the information about feedback behavior indicates that the user to be selected is active in marketing feedback.

For example, if the user is active, and is active in the marketing feedback, guiding information is sent to such a user, and guiding is more likely to succeed in comparison with an inactive user. As such, such a user can be determined as a user who is inclined to use a seed service, and is used as the target user.

In addition, in this example, the way of selecting the target user from users to be selected based on the public opinion described in FIG. 4 can also be used in this example.

Step 505: Send service flow guiding information to the target user, to lead the target user to use a seed service.

According to the method for guiding a service flow in this example, historical marketing feedback behavior of a user is analyzed to obtain a non-payment user who is interested in a notification or reminder, and finally information is accurately pushed to the potential non-payment user who is interested in a notification or reminder to implement guiding. As such, a guiding effect is improved.

Figure 6:
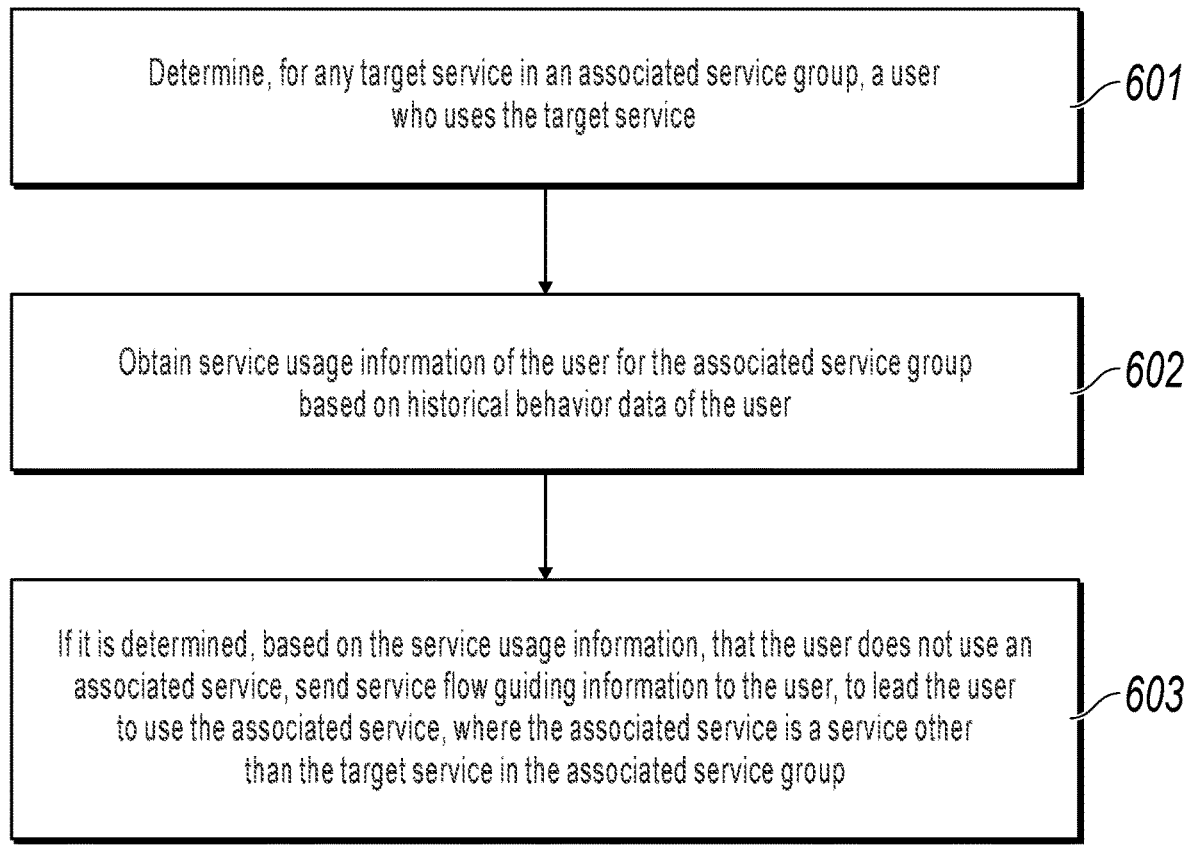
FIG. 6 is a schematic flowchart illustrating still another method for guiding a service flow, according to an implementation of the present disclosure.

In another example, FIG. 6 illustrates method for guiding a service flow. This method is different from the previous method that a target user is selected based on a seed user. In this example, a service that a user needs to be led to is determined based on a service used by the user. As shown in FIG. 6, the method includes the following steps.

Step 601: Determine, for any target service in an associated service group, a user who uses the target service.

The associated service group in the present step can be a predefined service group. An online payment service is still used as an example. Online payment services can include a plurality of payment services such as an electricity bill service, a water bill service, and a gas bill service. The plurality of payment services can be referred to as associated services. For example, for the electricity bill service, both the water bill service and the gas bill service can be referred to as associated services of the electricity bill service.

A user may use only some of the services. For example, the user uses only the electricity bill payment service or the electricity bill service and the water bill service. In this example, a service used by the user can be referred to as a target service. In another example, the associated service group can alternatively be a service type other than the online payment service.

Step 602: Obtain service usage information of the user for the associated service group based on historical behavior data of the user.

The historical behavior data in the present step can include many pieces of data of the user. The service usage information can include a service in the associated service group that is used by the user and a service in the associated service group that is not used by the user.

Step 603: If it is determined, based on the service usage information, that the user does not use an associated service, send service flow guiding information to the user, to lead the user to use the associated service, where the associated service is a service other than the target service in the associated service group.

In the present step, if it is determined, based on the service usage information, that the user does not use at least one associated service in the associated service group, for example, a user who uses the electricity bill service but does not use the water bill service and the gas bill service, the user can be led to use a service in the associated service group that is not used by the user. For example, the user who uses the electricity bill service can be led to use the water bill service or the gas bill service.

In the method in this example, during service flow guiding, a user is led to use a service that is not used by the user. As such, service recommendation is performed in a more specific way, so that guiding accuracy can be improved.

Figure 7:
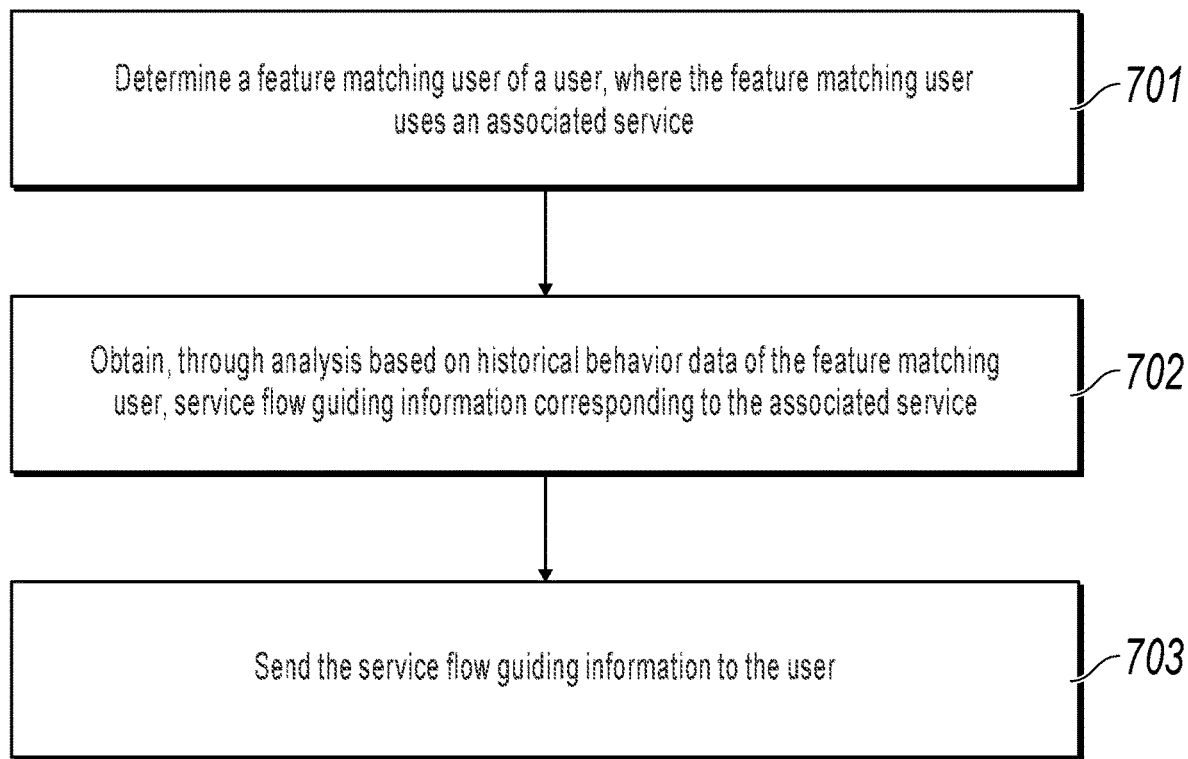
FIG. 7 is a schematic flowchart illustrating still another method for guiding a service flow, according to an implementation of the present disclosure.

In still another example, FIG. 7 illustrates still another method for guiding a service flow. In this example, when another associated service in an associated service group that is not used by a user is recommended to the user, guiding can be performed based on data of a user who uses the diverted associated service. As shown in FIG. 7, the method can include the following steps.

Step 701: Determine a feature matching user of a user, where the feature matching user uses an associated service.

The user in the present step can be referred to a target user, and the target user needs to be led to a certain service. The feature matching user can be a user who is located in the same neighborhood as the target user. In another example, a service coverage area of the associated service used by the feature matching user includes a neighborhood that the target user is located in, and the associated service is a service that the target user needs to be led to.

For example, a user uses an electricity bill service, but does not use a water bill service in online payment services. If the user needs to be led to the water bill service, a user who uses the water bill service is used as a feature matching user, and the water bill service is a service that a target user needs to be led to.

Step 702: Obtain, through analysis based on historical behavior data of the feature matching user, service flow guiding information corresponding to the associated service.

For example, in the present step, information related to guiding can be obtained through analysis based on the historical behavior data of the feature matching user. For example, in the example in step 701, when analysis is performed based on data of the user who uses the water bill service, a tap water company that controls a neighborhood that the target user is located in can be obtained, and guiding information of a water bill payment service from the tap water company can be subsequently sent.

Step 703: Send the service flow guiding information to the user.

In addition, in another example, guiding can be performed based on data of a user who uses a target service instead of based on data of a user who uses the diverted associated service. For example, service information related to the associated service can be determined based on historical behavior data of the user. For example, if the user needs to be led to a water bill service, service information such as a tap water company that a neighborhood of the user needs to pay to and a payment time period of the tap water company can be determined based on information of the neighborhood that is in data of the user, and then service flow guiding information is sent to the user based on the service information. For example, a bill reminder from the tap water company is sent at predetermined time.

In another example, before the service flow guiding information is sent to the user in the present step, whether the user is inclined to use the associated service can be alternatively predetermined. In other words, whether the user demands to use the associated service can be determined. If the user demands to use the associated service, recommendation can continue to be performed. If the user does not demand to use the associated service, even if the user does not use the associated service in the associated service group, the associated service may be not recommended to the user for guiding. The inclination can be determined based on the historical behavior data of the user.

For example, it can be determined that the user demands to use the associated service if historical publishing information of the user indicates that the user expects to use the associated service, or if user activeness information of the user indicates that service activeness of the user is high, and information about feedback behavior of the user for historical marketing indicates that the user is active in marketing feedback.

In the method in this example, during service flow guiding, a user is led to use a service that is not used by the user. As such, service recommendation is performed in a more specific way, so that guiding accuracy can be improved. In addition, guiding accuracy can be further improved by determining whether the user demands to use the associated service. Furthermore, more accurate guiding information can be obtained by analyzing the historical behavior data of the feature matching user.

Figure 8:
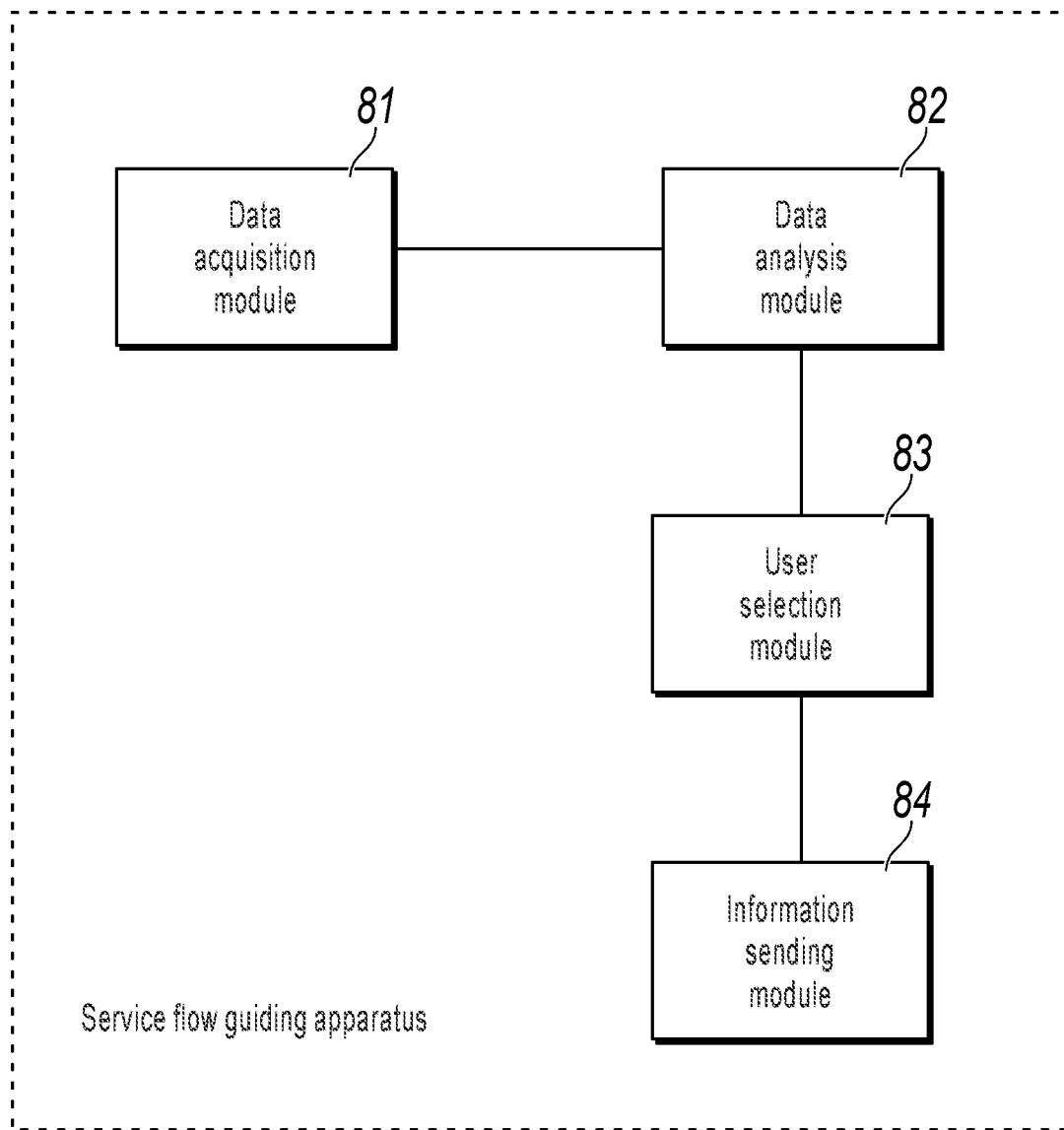
FIG. 8 is a schematic structural diagram illustrating an apparatus for guiding a service flow, according to an implementation of the present disclosure.

To implement the previous method for guiding a service flow, the present application further provides an apparatus for guiding a service flow. As shown in FIG. 8, the apparatus can include a data acquisition module 81, a data analysis module 82, a user selection module 83, and an information sending module 84.

The data acquisition module 81 is configured to obtain, for a target service, historical behavior data of a user who uses the target service.

The data analysis module 82 is configured to analyze the historical behavior data to obtain a user feature used to determine a target user for service flow guiding.

The user selection module 83 is configured to select, from users who do not use the target service, a user who satisfies the user feature as the target user.

The information sending module 84 is configured to send service flow guiding information to the target user, to lead the target user to use the target service.

In an example, the user selection module 83 is configured to select a user who does not use the target service and satisfies the user feature as a user to be selected, and obtain historical behavior data of the user to be selected; and select, based on the historical behavior data, a user who is inclined to use the target service as the target user.

In an example, when selecting the user who is inclined to use the target service as the target user, the user selection module 83 is configured to determine that the user to be selected is the target user if historical publishing information of the user to be selected indicates that the user to be selected expects to use the target service; or determine that the user to be selected is the target user if user activeness information of the user to be selected indicates that service activeness of the user to be selected is high, and information about feedback behavior of the user to be selected for historical marketing indicates that the user to be selected is active in marketing feedback.

Figure 9:
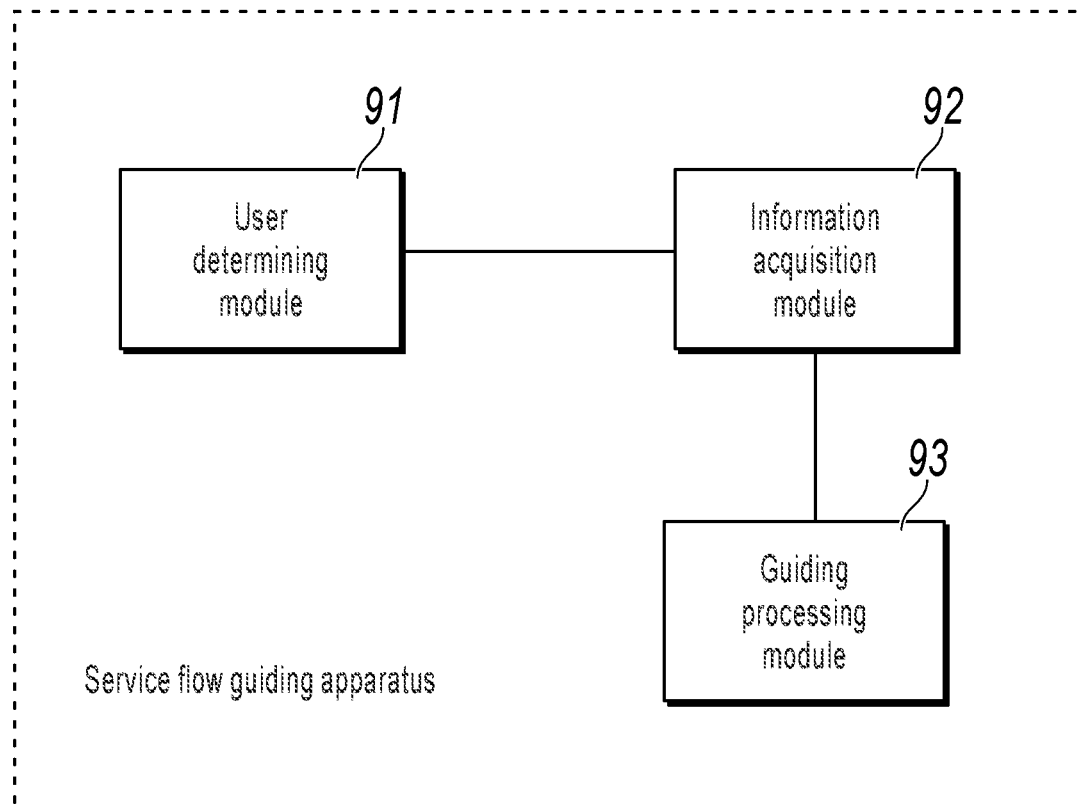
FIG. 9 is a schematic structural diagram illustrating an apparatus for guiding a service flow, according to an implementation of the present disclosure.

FIG. 9 shows a structure illustrating another apparatus for guiding a service flow. As shown in FIG. 9, the apparatus can include a user determining module 91, an information acquisition module 92, and a guiding processing module 93.

The user determining module 91 is configured to determine, for any target service in an associated service group, a user who uses the target service.

The information acquisition module 92 is configured to obtain service usage information of the user for the associated service group based on historical behavior data of the user.

The guiding processing module 93 is configured to: if it is determined, based on the service usage information, that the user does not use an associated service, send service flow guiding information to the user, to lead the user to use the associated service, where the associated service is a service other than the target service in the associated service group.

In an example, when sending the service flow guiding information to the user, the guiding processing module 93 is configured to determine a feature matching user of the user, where the feature matching user uses the associated service; and obtain, through analysis based on historical behavior data of the feature matching user, service flow guiding information corresponding to the associated service, and send the service flow guiding information to the user.

In an example, the information acquisition module 92 is further configured to determine, based on the historical behavior data of the user, that the user is inclined to use the associated service.

The apparatuses or modules described in the previous implementations can be implemented by a computer chip or an entity, or can be implemented by a product with a certain function. A typical implementation device is a computer, and the computer can be a personal computer, a laptop computer, a cellular phone, a camera phone, an intelligent phone, a personal digital assistant, a media player, a navigation device, an email receiving and sending device, a game console, a tablet computer, a wearable device, or any combination of some of these devices.

For ease of description, the previous apparatus is described by dividing the functions into various modules. Certainly, when the present disclosure is implemented, the functions of each module can be implemented in one or more pieces of software and/or hardware.

The previous descriptions are merely example implementations of the present disclosure, but are not intended to limit the present disclosure. Any modification, equivalent replacement, or improvement made without departing from the spirit and principle of the present disclosure should fall within the protection scope of the present disclosure.

Figure 10:
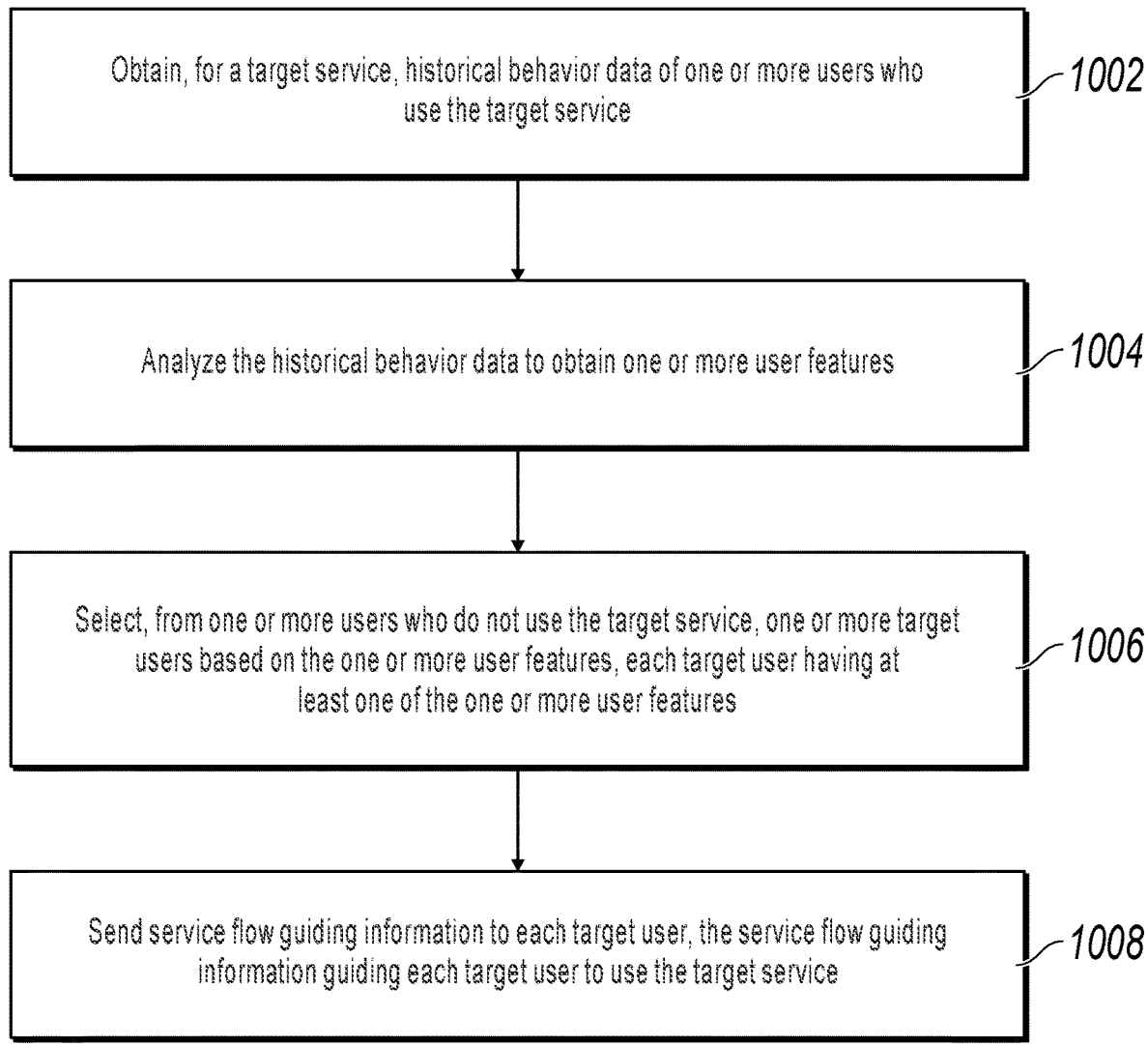
FIG. 10 is a flowchart illustrating an example of a computer-implemented method for delivering information, according to an implementation of the present disclosure.

FIG. 10 is a flowchart illustrating an example of a computer-implemented method 1000 for delivering information, according to an implementation of the present disclosure. For clarity of presentation, the description that follows generally describes method 1000 in the context of the other figures in this description. However, it will be understood that method 1000 can be performed, for example, by any system, environment, software, and hardware, or a combination of systems, environments, software, and hardware, as appropriate. In some implementations, various steps of method 1000 can be run in parallel, in combination, in loops, or in any order.

At 1002, historical behavior data of one or more users who use a target service is obtained for the target service. For example, the target service can be an electricity bill payment service. Historical behavior data of one or more users who use the electricity bill payment service can be obtained. In some implementations, an application (APP) can be used to obtain the historical behavior data. In some implementations, historical behavior data of a user can include at least one of geographical location information of the user, a historical payment record of the user, and an electricity company that a payment is made to. From 1002, method 1000 proceeds to 1004.

At 1004, the historical behavior data is analyzed to obtain one or more user features. In some implementations, the one or more user features can include a geographical range that the one or more users who use the target service are located within (e.g., location information about a neighborhood). For example, a geographical rang that the one or more users who use the target service are located within and a service institution corresponding to the target service can be obtained based on the historical behavior data. A geographical range in a service coverage area of the service institution then can be obtained based on the geographical range and the service institution. From 1004, method 1000 proceeds to 1006.

At 1006, one or more target users are selected from one or more users who do not use the target service based on the one or more user features. Each target user has at least one of the one or more user features. For example, one or more users located within the geographical range can be selected as the one or more target users (e.g., the one or more target users are located within the same neighborhood as the one or more users who use the target service). In some implementations, one or more users located within the geographical range in the service coverage area of the service institution can be selected as the one or more target users.

In some implementations, one or more potential users can be selected from the one or more users who do not use the target service based on the one or more user features. Each potential user has at least one of the one or more user features. Historical behavior data of the one or more potential users can be obtained. One or more users who are inclined to use the target service then can be selected from the one or more potential users based on the historical behavior data of the one or more potential users as the one or more target users.

In some implementations, the historical behavior data of the one or more potential users can include historical publishing information of the one or more potential users. For example, for each particular potential user, a determination can be made as to whether historical publishing information of the particular potential user indicates that the particular potential user expects to use the target service. In response to a determination that the historical publishing information of the particular potential user indicates that the particular potential user expects to use the target service, the particular potential user can be determined as a target user.

In some implementations, the historical behavior data of the one or more potential users can include user activeness information and feedback behavior information for historical marketing. For example, for each particular potential user, a determination can be made as to whether user activeness information of the particular potential user indicates that the particular potential user is active in service activeness and feedback behavior information for historical marketing of the particular potential user indicates that the particular potential user is active in marketing feedback. In response to a determination that the user activeness information of the particular potential user indicates that the particular potential user is active in service activeness and that the feedback behavior information for historical marketing of the particular potential user indicates that the particular potential user is active in marketing feedback, the particular potential user can be determined as a target user. From 1006, method 1000 proceeds to 1008.

At 1008, service flow guiding information is sent to each target user. The service flow guiding information can guide each target user to use the target service. For example, the service flow guiding information can be a bill reminder of an electricity bill. In some implementations, the service flow guiding information can include associated service flow guiding information. The associated service flow guiding information can guide each target user to use an associated service associated with the target service. For example, if the target service an electricity bill payment service, the associated service can be a water bill payment service or a gas bill payment service. After 1008, method 1000 stops.

Inter-service cross-guiding can be used to guide users of a service to a different service. Normally, an access portal for the different service is provided when the users use the service. For example, an access portal for paying a water bill is provided when a user is paying an electricity bill. In some cases, the user may use a water bill payment service when seeing the access portal. However, guiding through an access portal is passive guiding. It is unknown whether a user will use a recommended service through the access portal. For example, some users may not be interested in the recommended service provided through the access portal, and some users may already use the recommended service. The subject matter described in this specification provides an effective inter-service cross-guiding method without using a static access portal. For example, historical data of one or more seed users are analyzed to obtain one or more potential users who are inclined to use a certain service, and a guiding notification is sent to only the one or more potential users during service flow guiding. In doing so, selecting new users for a service is focused on potential users who are inclined to use the service. As a result, potential users are targeted instead of all possible users, thereby improving service flow guiding efficiency and user experience during service flow guiding.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method, comprising:
   registering, by an application system, a plurality of users, wherein the plurality of registered users of the application system include one or more first users who use an online payment service of the application system and one or more second users who do not use the online payment service of the application system, the online payment service of the application system includes at least one of a water bill payment service, an electricity bill payment service, a gas bill payment service, or a cable television bill payment service, each registered user of the plurality of registered users has an application of the application system installed on an electronic device associated with the registered user, the installed application includes a service portal of the online payment service, and a first user uses the online payment service to pay a bill through a service portal on an application installed on an electronic device associated with the first user;
   obtaining, by the application system and for the online payment service of the application system, historical behavior data of the one or more first users who use the online payment service;
   analyzing, by the application system, the historical behavior data to obtain one or more user features, wherein the one or more user features include a geographical range that the one or more first users who use the online payment service are located within;
   identifying, by the application system and from the plurality of registered users, the one or more second users who do not use the online payment service based on stored data associated with the plurality of registered users, wherein the one or more first users who use the online payment service and the one or more second users who do not use the online payment service are located in the same geographical range;
   selecting, by the application system and from the one or more second users who do not use the online payment service, one or more target users based on the one or more user features, wherein each target user has at least one of the one or more user features;
   sending, by the application system and to the one or more first users who use the online payment service, one or more bill reminders associated with the online payment service;
   sending, by the application system, service flow guiding information to each target user, wherein the service flow guiding information guides each target user to use the online payment service through a service portal on an application installed on an electronic device associated with the target user; and
   in response to at least one target user using the online payment service based on the service flow guiding information, updating, by the application system, the one or more first users who use the online payment service to include the at least one target user.

2. The computer-implemented method of claim 1, wherein selecting one or more target users comprises selecting one or more users located within the geographical range as the one or more target users.

3. The computer-implemented method of claim 1, wherein analyzing the historical behavior data to obtain one or more user features comprises:
   obtaining, based on the historical behavior data, the geographical range that the one or more first users who use the online payment service are located within and a service institution corresponding to the online payment service; and obtaining, based on the geographical range and the service institution, a geographical range in a service coverage area of the service institution; and wherein selecting one or more target users comprises selecting one or more users located within the geographical range in the service coverage area of the service institution as the one or more target users.

4. The computer-implemented method of claim 1, wherein selecting one or more target users comprises:

selecting, from the one or more second users who do not use the online payment service, one or more potential users based on the one or more user features, wherein each potential user has at least one of the one or more user features;

obtaining historical behavior data of the one or more potential users; and selecting, from the one or more potential users and based on the historical behavior data of the one or more potential users, one or more users who are inclined to use the online payment service as the one or more target users.

5. The computer-implemented method of claim 4, wherein the historical behavior data of the one or more potential users include historical publishing information of the one or more potential users, and wherein selecting one or more users who are inclined to use the online payment service as the one or more target users comprises:

for each particular potential user:
determining whether historical publishing information of the particular potential user indicates that the particular potential user expects to use the online payment service; and
in response to determining that the historical publishing information of the particular potential user indicates that the particular potential user expects to use the online payment service, determining the particular potential user as a target user.

6. The computer-implemented method of claim 4, wherein the historical behavior data of the one or more potential users include user activeness information and feedback behavior information for historical marketing, and wherein selecting one or more users who are inclined to use the online payment service as the one or more target users comprises:

for each particular potential user:
determining whether user activeness information of the particular potential user indicates that the particular potential user is active in service activeness and whether feedback behavior information for historical marketing of the particular potential user indicates that the particular potential user is active in marketing feedback; and
in response to determining that the user activeness information of the particular potential user indicates that the particular potential user is active in service activeness and that the feedback behavior information for historical marketing of the particular potential user indicates that the particular potential user is active in marketing feedback, determining the particular potential user as a target user.

7. The computer-implemented method of claim 1, wherein the service flow guiding information includes associated service flow guiding information, and wherein the associated service flow guiding information guides each target user to use an associated service associated with the online payment service.

8. A non-transitory, computer-readable medium storing one or more instructions executable by a computer system to perform operations comprising:

registering, by an application system, a plurality of users, wherein the plurality of registered users of the application system include one or more first users who use an online payment service of the application system and one or more second users who do not use the online payment service of the application system, the online payment service of the application system includes at least one of a water bill payment service, an electricity bill payment service, a gas bill payment service, or a cable television bill payment service, each registered user of the plurality of registered users has an application of the application system installed on an electronic device associated with the registered user, the installed application includes a service portal of the online payment service, and a first user uses the online payment service to pay a bill through a service portal on an application installed on an electronic device associated with the first user;

obtaining, for the online payment service of the application system, historical behavior data of the one or more first users who use the online payment service;

analyzing the historical behavior data to obtain one or more user features, wherein the one or more user features include a geographical range that the one or more first users who use the online payment service are located within;

identifying, from the plurality of registered users, the one or more second users who do not use the online payment service based on stored data associated with the plurality of registered users, wherein the one or more first users who use the online payment service and the one or more second users who do not use the online payment service are located in the same geographical range;

selecting, from the one or more second users who do not use the online payment service, one or more target users based on the one or more user features, wherein each target user has at least one of the one or more user features;

sending one or more bill reminders associated with the online payment service to the one or more first users who use the online payment service;

sending service flow guiding information to each target user, wherein the service flow guiding information guides each target user to use the online payment service through a service portal on an application installed on an electronic device associated with the target user; and in response to at least one target user using the online payment service based on the service flow guiding information, updating, by the application system, the one or more first users who use the online payment service to include the at least one target user.

9. The non-transitory, computer-readable medium of claim 8, wherein selecting one or more target users comprises selecting one or more users located within the geographical range as the one or more target users.

10. The non-transitory, computer-readable medium of claim 8, wherein analyzing the historical behavior data to obtain one or more user features comprises:

obtaining, based on the historical behavior data, the geographical range that the one or more first users who use the online payment service are located within and a service institution corresponding to the online payment service; and obtaining, based on the geographical range and the service institution, a geographical range in a service coverage area of the service institution; and wherein selecting one or more target users comprises selecting one or more users located within the geographical range in the service coverage area of the service institution as the one or more target users.

11. The non-transitory, computer-readable medium of claim 8, wherein selecting one or more target users comprises:

selecting, from the one or more second users who do not use the online payment service, one or more potential users based on the one or more user features, wherein each potential user has at least one of the one or more user features;

obtaining historical behavior data of the one or more potential users; and selecting, from the one or more potential users and based on the historical behavior data of the one or more potential users, one or more users who are inclined to use the online payment service as the one or more target users.

12. The non-transitory, computer-readable medium of claim 11, wherein the historical behavior data of the one or more potential users include historical publishing information of the one or more potential users, and wherein selecting one or more users who are inclined to use the online payment service as the one or more target users comprises:

for each particular potential user:
determining whether historical publishing information of the particular potential user indicates that the particular potential user expects to use the online payment service; and in response to determining that the historical publishing information of the particular potential user indicates that the particular potential user expects to use the online payment service, determining the particular potential user as a target user.

13. The non-transitory, computer-readable medium of claim 11, wherein the historical behavior data of the one or more potential users include user activeness information and feedback behavior information for historical marketing, and wherein selecting one or more users who are inclined to use the online payment service as the one or more target users comprises:

for each particular potential user:
determining whether user activeness information of the particular potential user indicates that the particular potential user is active in service activeness and whether feedback behavior information for historical marketing of the particular potential user indicates that the particular potential user is active in marketing feedback; and in response to determining that the user activeness information of the particular potential user indicates that the particular potential user is active in service activeness and that the feedback behavior information for historical marketing of the particular potential user indicates that the particular potential user is active in marketing feedback, determining the particular potential user as a target user.

14. The non-transitory, computer-readable medium of claim 8, wherein the service flow guiding information includes associated service flow guiding information, and wherein the associated service flow guiding information guides each target user to use an associated service associated with the online payment service.

15. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:

registering, by an application system, a plurality of users, wherein the plurality of registered users of the application system include one or more first users who use an online payment service of the application system and one or more second users who do not use the online payment service of the application system, the online payment service of the application system includes at least one of a water bill payment service, an electricity bill payment service, a gas bill payment service, or a cable television bill payment service, each registered user of the plurality of registered users has an application of the application system installed on an electronic device associated with the registered user, the installed application includes a service portal of the online payment service, and a first user uses the online payment service to pay a bill through a service portal on an application installed on an electronic device associated with the first user;

obtaining, for the online payment service of the application system, historical behavior data of the one or more first users who use the online payment service;

analyzing the historical behavior data to obtain one or more user features, wherein the one or more user features include a geographical range that the one or more first users who use the online payment service are located within;

identifying, from the plurality of registered users, the one or more second users who do not use the online payment service based on stored data associated with the plurality of registered users, wherein the one or more first users who use the online payment service and the one or more second users who do not use the online payment service are located in the same geographical range;

selecting, from the one or more second users who do not use the online payment service, one or more target users based on the one or more user features, wherein each target user has at least one of the one or more user features;

sending one or more bill reminders associated with the online payment service to the one or more first users who use the online payment service;

sending service flow guiding information to each target user, wherein the service flow guiding information guides each target user to use the online payment service through a service portal on an application installed on an electronic device associated with the target user; and in response to at least one target user using the online payment service based on the service flow guiding information, updating, by the application system, the one or more first users who use the online payment service to include the at least one target user.

16. The computer-implemented system of claim 15, wherein selecting one or more target users comprises selecting one or more users located within the geographical range as the one or more target users.

17. The computer-implemented system of claim 15, wherein analyzing the historical behavior data to obtain one or more user features comprises:
   obtaining, based on the historical behavior data, the geographical range that the one or more first users who use the online payment service are located within and a service institution corresponding to the online payment service; and
   obtaining, based on the geographical range and the service institution, a geographical range in a service coverage area of the service institution; and
   wherein selecting one or more target users comprises selecting one or more users located within the geographical range in the service coverage area of the service institution as the one or more target users.

18. The computer-implemented system of claim 15, wherein selecting one or more target users comprises:
   selecting, from the one or more second users who do not use the online payment service, one or more potential users based on the one or more user features, wherein each potential user has at least one of the one or more user features;
   obtaining historical behavior data of the one or more potential users; and
   selecting, from the one or more potential users and based on the historical behavior data of the one or more potential users, one or more users who are inclined to use the online payment service as the one or more target users.

19. The computer-implemented system of claim 18, wherein the historical behavior data of the one or more potential users include historical publishing information of the one or more potential users, and wherein selecting one or more users who are inclined to use the online payment service as the one or more target users comprises:
   for each particular potential user:
      determining whether historical publishing information of the particular potential user indicates that the particular potential user expects to use the online payment service; and
      in response to determining that the historical publishing information of the particular potential user indicates that the particular potential user expects to use the online payment service, determining the particular potential user as a target user.

20. The computer-implemented system of claim 18, wherein the historical behavior data of the one or more potential users include user activeness information and feedback behavior information for historical marketing, and wherein selecting one or more users who are inclined to use the online payment service as the one or more target users comprises:
   for each particular potential user:
      determining whether user activeness information of the particular potential user indicates that the particular potential user is active in service activeness and whether feedback behavior information for historical marketing of the particular potential user indicates that the particular potential user is active in marketing feedback; and
      in response to determining that the user activeness information of the particular potential user indicates that the particular potential user is active in service activeness and that the feedback behavior information for historical marketing of the particular potential user indicates that the particular potential user is active in marketing feedback, determining the particular potential user as a target user.

* * * * *